Nov. 5, 1957 C. P. CHAPPELL 2,811,906
METHOD OF FORMING A FLOOR OR SURFACE COVERING
Filed Feb. 21, 1955
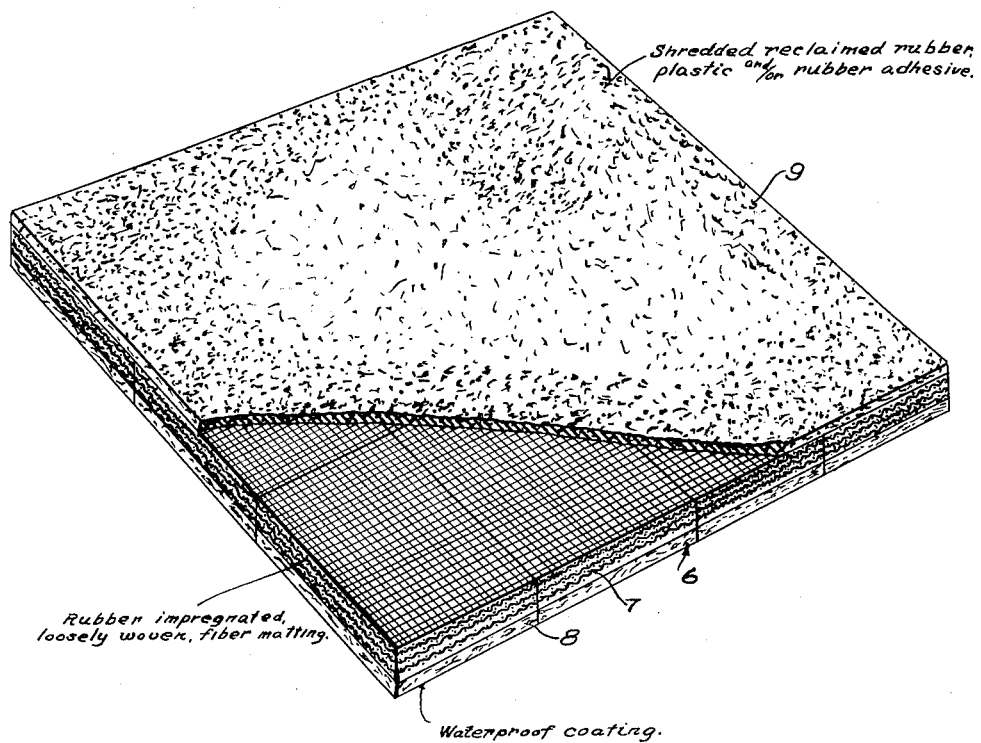
Clifford P. Chappell
INVENTOR 2,811,906

METHOD OF FORMING A FLOOR OR SURFACE COVERING

Clifford P. Chappell, Trenton, N. J.

Application February 21, 1955, Serial No. 489,569

2 Claims. (Cl. 94—22)

This invention relates to a covering for floors, such as ground surfaces, paved or otherwise, the construction of the covering being designed primarily to protect floor surfaces and provide a perfect track surface for horse shows, ramps, race tracks or the like.

An important object of the invention is to provide a friction surface of a portable or permanent character, which will prevent slipping of horses using the covered surface, in racing or jumping, or during horse shows.

Another object of the invention is to provide a surface covering which will reduce noise to a minimum, and one which will withstand the wear to which floor surfaces will be subjected by horses running thereover and a covering which will adapt itself for ready and easy installation.

Still another object of the invention is to provide a covering which when worn in spots may be readily repaired, providing a smooth wear surface.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing, the figure illustrates a section of a surface covering constructed in accordance with the invention, a portion of the upper layer of the covering having been broken away, illustrating the rubber impregnated loosely woven fiber matting forming the base of the covering.

Referring to the drawing in detail, in forming a covering or track surface constructed in accordance with the invention, a base 6 is provided, the base being constructed preferably of rubber impregnated loosely woven fibrous material 7 in the form of matting. In the construction of the covering, and with durability of the covering in mind, the woven fiber matting 7 is constructed preferably of hemp, jute or the like, and as previously indicated, the fabric is loosely woven providing wide mesh to receive the rubber 8 used in impregnating the fiber matting. It might be here stated that the rubber used in impregnating the fiber matting, is preferably synthetic rubber and of the type reclaimed from discarded motor vehicle tires. While I have described the base as constructed of rubber impregnated fiber matting, impregnated with synthetic rubber removed from discarded motor vehicle tires, it is to be understood that it is within the scope of the present invention to use any desirable type of rubber desired in the impregnation of the loosely woven fiber material.

In constructing the covering, the lower surface of the base is supplied with a coating 8 of water proof material and embodies preferably, a composition of asphalt and shredded reclaimed rubber.

The covering is formed preferably in blocks of uniform sizes so that in the formation of a track surface, the blocks may be laid side by side in a manner as shown by the drawing and then the upper or top layer 9 is provided, completely covering the upper surfaces of the sections of the covering providing a smooth even surface over the entire top of the track.

This upper or top layer is also constructed of rubber plastic formed of ground reclaimed rubber, rosin and rubber adhesive, the coating being applied under pressure.

It might be further stated that the coating 6 of the base is further waterproofed by coating the same with asphalt, paint or similar waterproofing tar or base material.

From the foregoing it will be seen that due to the construction shown and described, I have provided a covering to be used in the formation of tracks for horse shows, ramps or the like, which cover will not only prevent wear of the surface covered by the same, but will provide a surface that will prevent slipping of the horses running or jumping thereon, as well as reducing noises incident to horses running over a surface and which is objectionable in an enclosure, such as a building wherein horse shows are frequently held. It will also be seen that due to the construction of the covering the surface coating may be removed at any particular point and a block inserted in lieu of a damaged block whereby the covering material can then be again supplied to provide a smooth running surface or track.

It is believed that in view of the foregoing detail description, the construction of applicant's covering will be obvious.

Having thus described the invention, what is claimed is:

1. The method of forming a surface covering over a base of edge abutting blocks which includes overlaying the blocks with a covering formed of loosely woven fibrous material, impregnating the covering with a binder and coating the impregnated covering with a composition coating formed of integrated compressed ground rubber and rosin and applied under pressure to provide a semi-rigid surface.

2. The method of forming a surface covering over a base of edge abutting blocks which includes water-proofing the lower sides of said blocks, overlaying the blocks with a covering formed of loosely woven fibrous material, impregnating the covering with a binder, and coating the impregnated covering with a composition coating formed of integrated compressed ground rubber and rosin and applied to provide a semi-rigid surface.

References Cited in the file of this patent

UNITED STATES PATENTS

| | | |
|---|---|---|
| 1,645,635 | Wescott | Oct. 18, 1927 |
| 2,042,377 | Bamber | May 26, 1936 |
| 2,139,816 | Fordyce | Dec. 13, 1938 |
| 2,678,081 | Rainard et al. | May 11, 1954 |